(12) United States Patent
Gwilliam

(10) Patent No.: US 10,675,663 B2
(45) Date of Patent: Jun. 9, 2020

(54) ENCLOSURE FOR CONTAINMENT OF MATERIAL

(71) Applicant: Claverend Innovations Limited, Gloucestershire (GB)

(72) Inventor: Graham James Gwilliam, Gloucestershire (GB)

(73) Assignee: CLAVEREND INNOVATIONS LIMITED, Coleford (GB)

( * ) Notice: Subject to any disclaimer, the term of this patent is extended or adjusted under 35 U.S.C. 154(b) by 0 days.

(21) Appl. No.: 15/648,478

(22) Filed: Jul. 13, 2017

(65) Prior Publication Data

US 2018/0015513 A1    Jan. 18, 2018

(30) Foreign Application Priority Data

Jul. 13, 2016  (GB) .................................. 1612183.2

(51) Int. Cl.
| | | |
|---|---|---|
| B08B 15/02 | (2006.01) | |
| B25J 21/02 | (2006.01) | |
| B09B 3/00 | (2006.01) | |
| A01K 29/00 | (2006.01) | |
| B08B 9/023 | (2006.01) | |
| B65D 33/02 | (2006.01) | |

(52) U.S. Cl.
CPC .............. *B08B 15/02* (2013.01); *A01K 29/00* (2013.01); *B08B 9/023* (2013.01); *B08B 15/026* (2013.01); *B09B 3/0066* (2013.01); *B25J 21/02* (2013.01); *B65D 33/02* (2013.01)

(58) Field of Classification Search
CPC ...... A01K 29/00; B08B 15/02; B08B 15/026; B08B 9/023; B25J 21/02; B65D 33/02; B09B 3/0066
See application file for complete search history.

(56) References Cited

U.S. PATENT DOCUMENTS

| | | | | |
|---|---|---|---|---|
| 2,151,908 | A | * 3/1939 | Gottlieb | ................ E04B 1/3441 135/117 |
| 2,440,557 | A | 4/1948 | Power | |
| 2,976,876 | A | * 3/1961 | Lönnqvist | ............. E04H 15/322 135/120.2 |

(Continued)

FOREIGN PATENT DOCUMENTS

| | | |
|---|---|---|
| EP | 0178091 A1 | 4/1986 |
| GB | 2173143 A | 10/1986 |

(Continued)

*Primary Examiner* — Hanh V Tran
(74) *Attorney, Agent, or Firm* — Stuart H. Mayer; Mayer & Williams PC

(57) ABSTRACT

An enclosure for containment and removal of hazardous material from objects is described, having a frame comprising a plurality of bars and a plurality of joints, each joint being releasably connectable to at least two bars, a flexible bag attachable to the frame, the bag being at least in part transparent, and comprising a resealable seam, and at least one adjusting device for tightening or loosening the bag on the frame. Usually, the enclosure, in use, is a negative pressure enclosure. The enclosure is particularly useful for containing and removing asbestos, especially from pipes. Also described are methods for removal of hazardous material from an object and methods for isolating an animal having an infectious and/or contagious disease using the enclosures.

11 Claims, 4 Drawing Sheets

(56) References Cited

U.S. PATENT DOCUMENTS

| | | | | |
|---|---|---|---|---|
| 5,147,242 A | * | 9/1992 | Lowe, Jr. | B08B 15/026 |
| | | | | 312/1 |
| 5,307,829 A | | 5/1994 | Dalo | |
| 5,785,396 A | | 7/1998 | Israel | |
| 7,025,074 B2 | * | 4/2006 | Porter | E04H 15/46 |
| | | | | 135/119 |
| 7,766,024 B2 | * | 8/2010 | Rottmann | E04H 15/18 |
| | | | | 135/122 |
| 2004/0170525 A1 | | 9/2004 | Ettlinger | |
| 2004/0238007 A1 | | 12/2004 | Jones | |
| 2010/0044372 A1 | | 2/2010 | Kournikakis | |

FOREIGN PATENT DOCUMENTS

| | | |
|---|---|---|
| GB | 2226878 A | 7/1990 |
| GB | 2349933 A | 11/2000 |
| WO | 2006/000795 A1 | 1/2006 |
| WO | 2006138232 A2 | 12/2006 |

* cited by examiner

ENCLOSURE FOR CONTAINMENT OF MATERIAL

FIELD OF THE INVENTION

The present invention relates to enclosures for containment of material, uses of such enclosures and methods for the removal of hazardous materials, especially asbestos, from objects including pipes, tanks, vessels, boilers, machinery and ducts.

DESCRIPTION OF THE RELATED ART

The long-term danger to health caused by asbestos dust is well known. It is necessary for people to take considerable care to avoid exposure to asbestos dust. By law, asbestos removal must be carried out in a certain way to ensure safety and compliance with government health and safety regulations.

Objects and workpieces have been stripped of hazardous material such as asbestos by enclosing them within a bag having gauntlets enabling an operator to remove the asbestos without directly contacting it. The asbestos falls to the bottom of the bag which is then sealed and removed for disposal.

US-A-2010/044372 discloses a portable, collapsible isolator for containing radioactive, chemical or biological agents. The isolator has a collapsible frame, and a flexible and collapsible envelope in the form of an airtight bag attached to the frame to define a cavity.

WO-A-2006/000795 discloses a single or multi chamber contamination control entrance chamber having one or more chambers separated by hanging flaps at each end of each chamber. The chambers are suspended from a substantially rigid frame.

U.S. Pat. No. 5,785,396 describes a glove bag for use in removing asbestos (or other hazardous material) from pipes and other structures such as beams. The bag fits around the structure, and flaps, glue and tape seal the bag around the structure. Gloves are provided for the worker to handle the asbestos and provisions are made for introduction of a wand to spray the material with water.

GB-A-2,226,878 discloses apparatus for use in removing asbestos or other harmful materials from pipes or other elongate members, and comprises a flexible bag, which is made at least in part of transparent plastics material and which can be mounted on a pipe.

GB-A-2,349,933 describes an apparatus for treating asbestos lagged pipes comprising two annular spacers which wrap around the pipe and a shroud which is attached to the spacers. The spacers are intended to prevent the shroud from touching the pipe, even under conditions of a vacuum.

GB-A-2,173,143 describes an enclosure which is partly transparent, having at least three sleeve portions extending into the interior of the device and through which an operator may insert an arm to reach an object positioned within the device. The device is particularly intended for handling asbestos and may be used in stripping asbestos from night storage heaters.

However, the problem with bags known in the art is that the inside surface becomes contaminated with asbestos dust, so that when the bag rests on the pipe it becomes impossible to clean the pipe of asbestos. Further, it is not possible to use the bag under negative pressure (which helps to prevent asbestos dust escaping the bag) because the bag will be distorted and become sucked inwards and cling to the pipe.

There have been attempts to solve these problems. GB-A-2,226,878 describes an apparatus for use in removing asbestos from pipes comprising a flexible bag which is mounted on a cage for supporting the bag clear of an area of the pipe to be stripped.

Although the presence of a cage helps in preventing the bag resting on the pipe during the stripping of asbestos, it does not prevent distortion and stretching of the bag under negative pressure (which therefore makes it difficult for the user to effectively work to remove the asbestos inside the bag).

Therefore, there exists a need to provide an enclosure for containing materials, especially hazardous materials such as asbestos, that may be used, for example, in methods of safely and effectively removing and containing asbestos for disposal from pipes.

It is an aim of the present invention to address this need.

BRIEF SUMMARY OF THE INVENTION

The present invention accordingly provides, in a first aspect, an enclosure for containment of material, the enclosure comprising: a frame comprising a plurality of bars and a plurality of joints, each joint being releasably connectable to at least two bars, a flexible bag attachable to the frame, the bag being at least in part transparent, and comprising a resealable seam; and at least one adjusting device for tightening or loosening the bag on the frame.

The enclosure of the present invention is advantageous because it allows the bag to be tightened on the frame using one of more adjusting devices, so that any slack in the bag may be removed. This is particularly advantageous under conditions of negative pressure inside the bag, because the bag has much less tendency to stretch or distort, or move around if the pressure within the bag changes. The bag is therefore more stable and allows the user to work more quickly and effectively. To be able to work quickly and effectively is particularly important when working with hazardous materials such as asbestos.

A further advantage of the invention is that the enclosures may be assembled quickly, in situ and is able to be assembled in modules of varying size, shape and extent depending on the intended use and the shape of the object from which the hazardous material is to be removed. For example, the enclosure may be assembled/fitted around straight pipe, generally straight pipe with a horizontal outlet (i.e. horizontal tee), straight pipe with vertical outlet (i.e. vertical tee), straight pipe with two horizontal or vertical outlets (i.e. cross-shaped), swept bend from straight pipe, swept horizontal bend, or swept vertical bend.

Thus, the enclosure may be used in particular for containment and removal of hazardous material from pipes. Preferably, the enclosure, in use, is a negative pressure enclosure (i.e. the pressure inside the enclosure is less than that of atmospheric pressure) helping to contain material, even loose and particulate material, inside the enclosure.

Preferably, the inside of the bag is not in contact with the frame, so that the frame does not become contaminated with material. Preferably, the bag comprises external tabs or sleeves through which the bars can be inserted, so that the bag is supported by the frame but the frame does not come into contact with the inside of the bag. Preferably, the bag comprises sleeves through which the bars can be inserted.

Thus, preferably, the flexible bag is attachable to the frame by a plurality of attachment fixings, whereby the frame is outside the bag.

The frame comprises bars which are releasably connected together using joints. Each joint may comprise two or more bar supports in to which bars may be placed. The bars are releasably connected together using the joints, so the frame can be easily assembled and disassembled. A further advantage of the joints is that the frame may be reused (especially since the frame is preferably outside the bag), and the frame may be quick and easy to install without having too many elements.

The bars may generally have any cross-sectional area shape, for example substantially circular, square or triangular. Preferably, the cross-sectional area of the bars is substantially circular. This is advantageous because a bar with a circular cross section has relatively low manufacturing costs, does not have any sharp edges that may damage the bag, and is strong under tension.

Further, the cost of manufacturing joints with a corresponding bar supports for receiving or fixing to circular cross sections is relatively low (compared to other shapes such as square or triangular) and such bar supports are strong.

The bars may be manufactured from any suitable material, such as a plastic (e.g. PVC) or metal (e.g. aluminium). Preferably, the bars are manufactured from metal and more preferably aluminium. The advantage of using aluminium is that it is strong and relatively rigid (and so can support the bag under tension, and provides a rigid frame), and it is low cost and of relatively low density.

The joints connect the bars of the frame to one another. The use of such joints is advantageous as the shape of the enclosure may be easily modified (and therefore adaptable to different sizes and shapes of object to be contained).

The joints may be manufactured from any suitable material which provides a strong support for the bar. Preferably, the joints are manufactured from a polymer such as nylon, high density polypropylene or polyethylene. Most preferably, the joints are manufactured from polypropylene.

The bar may be firmly fixed on the joint. In this case, the joint may connect to the bar using any suitable firm attachment method, such as a screw fit, a depressible pin and socket fit, or push fit (for example, in which the joint has a series of outwardly extending ribs which frictionally engage with the inside surface of the bar).

A push fit attachment method is relatively low cost to manufacture, very little manipulation of the bars and joints is required in order to assemble the frame, and there are no sharp edges that may damage the bag.

Alternatively, the bar may be held less firmly by the bar support. When the cross section of the bar and bar support is circular, the bar may be able to rotate on the bar support. In this case, the bar supports should be long enough so that they extend sufficiently far into the bar end to prevent the bars from coming away from the joints when the enclosure is assembled.

Preferably, the bar would be connected to the joint using a bar support with a male or female fitting at one end and a male or female thread at the other, the thread engaging with a female or male thread of the adjustable joint.

The bag may comprise any flexible material, which is at least in part transparent so that the user can see inside the bag to remove the hazardous material from the pipe.

Preferably, the bag comprises PVC. The use of PVC is advantageous as it may be transparent and chemically resistant. Alternatively, the bag may comprise polyurethane or a fluorinated polymer.

Preferably, the bag is single use and is thrown away once used. This is advantageous, as it reduces the chances of spillage or release of hazardous material.

The bag should preferably be made with the minimum number of joins or seams and most preferably from one piece of material (it is desirable to minimise the number of joins, as each join can potentially create a weak point in the bag to allow the escape of material and/or splitting of the bag).

Any joins or seams in the bag may be joined to form an air tight seal by any suitable sealing method. For example, the seams may be sealed with one or more of zip fastener, glue or welding. When the bag is made of PVC, preferably the sealing method is welding, more preferably high frequency welding.

The bag comprises a resealable seam, so that the bag can be wrapped around an object (e.g. a pipe) that may be to be contained. The method of sealing the bag may be any suitable method by which an air tight seam is achieved, for example one or more of a zip fastener, welding, or glue. Preferably, the resealable seam comprises an air-tight zip fastener, as this is a quick and convenient method for sealing the bag for the user.

The adjusting devices may be used to tighten the bag on the frame once the enclosure has been assembled. A bag which is held taut on the frame is particularly advantageous under conditions of negative pressure inside the bag, because the bag will have less tendency to stretch or distort, or move around if the pressure within the bag changes (at least to a far lesser extent than if the bag was not held tight on the frame). The bag is therefore more stable and allows the user to work more quickly and effectively.

The adjusting device may comprise a mechanism (such as a screw, or ratchet) which increases the length of at least part of the frame, thereby causing the bag to tighten. The adjusting device may be part of the bars and/or the joints of the frame. Thus, at least one bar may comprise the at least one adjusting device. Additionally, or alternatively, at least one joint may comprise the at least one adjusting device.

Usually, each joint (or alternatively each bar of the frame) may comprise an adjusting device so that each face (e.g. at least one face, at least two faces, at least three faces or at least four faces) of the enclosure may be tightened.

Preferably, the adjusting device is formed as part of the joints. This is advantageous as there are fewer parts to assemble when constructing the enclosure, thereby saving time and associated costs.

Preferably, the adjusting device comprises a screw mechanism. Once the bag has been assembled on the frame, a key may be used to turn and lengthen the screw thread (and thereby move the screw thread out of the screw thread sleeve) which in turn increases the overall length of part of the frame. This causes the bag to stretch on the frame and become taut.

Rather than using a key to lengthen the screw thread of the adjusting device, the screw thread may be such as to have a handle or knob to be gripped by hand and turned.

If the bar is firmly attached to a bar support, so that the bar cannot rotate on the bar support, the direction of the screw thread at one end of the bar (e.g. clockwise) is preferably opposite to the direction of the screw thread at the opposing end of the same bar (e.g. anticlockwise). That is, a bottle screw mechanism may be used so that when the screw thread at one end of the bar is turned, the direction of the screw thread at the opposing end may turn in the opposing direction so that the overall length of the frame increases.

Alternatively, the bar may comprise a rotatable joint at a point along its length to allow one half of the bar to rotate with respect to the other half of the bar as the screw thread is turned.

If the bar is not firmly fixed to the joint and the bar support is able to rotate within the bar (the cross section of the bar and bar support is circular), the direction of the screw thread at opposing ends of the bar can be the same or opposite. That is, when the screw thread at one end of the bar is turned, the bar would not rotate and the screw thread at the opposing end of the bar would not turn.

In the case where the bar is not firmly fixed to the joint, the bar supports will need to be long enough to extend sufficiently far into the bar to prevent the bar from detaching from the joints when the enclosure is assembled and extended.

Each bar support and/or joint of the frame may comprise an adjusting device, so that each end of each bar may be lengthened and the bag may be evenly tightened over the whole frame. This is advantageous, as the stretching force on the bag is evenly distributed and the bag is not put under unnecessary stress in one area (which would make that area of the bag more susceptible to tears or splits).

The joints may further comprise extension sockets to allow the shape of the enclosure to be modified and/or extended.

Preferably, the extension sockets may be part of the joints and allow further bars to be inserted onto the joints. This allows the enclosure to be enlarged to accommodate longer pipes or to be modified to accommodate bends or T-sections in the pipe to be treated.

The bag preferably further comprises at least one hand pocket or gauntlet to allow an operative to access the material to be contained within the bag. Preferably, the material of the hand pockets is flexible and provides the user with sensitivity of feel, thereby increasing the user's working efficiency. The hand pockets may be made of any suitable material, for example. PVC.

One particularly important use for the enclosures of the present invention is to contain an elongate object such as a beam or pipe that may be lagged with asbestos whilst the asbestos is removed from the object, usually a pipe. Thus, preferably, the enclosure may further comprise at least two pipe supports to support a pipe extending in the enclosure. The bag may comprise the pipe supports. For example, the bag may comprise at least one pipe support comprising a resealable aperture in the bag to support a pipe extending through the enclosure.

Such a pipe support may contact the pipe and should create an air-tight seal between the bag and the pipe to be treated. Any suitable sealing method may be used. Preferably, the pipe supports may comprise adjustable ties, which can be pulled tight to form an airtight seal around the pipe. The adjustable ties may preferably comprise a ratchet mechanism, (preferably with sealing means so that the seal may be airtight) or a cam tightening and/or locking mechanism.

Preferably, the enclosure is maintained under negative pressure and thus the enclosure preferably comprises a negative pressure connector for connecting a source of negative pressure (e.g. vacuum pump) to the interior of the bag. In use, preferably, the interior of the bag is connected to a source of negative pressure during a removal/stripping operation. The source of negative pressure may be continuous, periodic or applied as necessary by the user. Preferably, the source of negative pressure is continuous. A convenient and useful negative pressure generator would be portable, preferably battery-powered, for example, a battery-powered small fan (e.g. respirator fan). Battery-powered fans are advantageous because they do not require power leads (and can therefore be used where mains/reticulated supply of electricity is not available) and are compact.

Preferably, the negative pressure connector is associated (or comprises) a filter, preferably a P3 filter, most preferably a High-efficiency particulate arrestance (HEPA) filter. Thus, preferably, the negative pressure connector comprises a particulate filter, preferably a HEPA filter.

The bag may preferably further comprise a valve to allow air to enter the bag under conditions of excessive negative pressure, preferably the valve is a one-way valve, more preferably an adjustable flow valve. Excessive negative pressure is a negative pressure greater than that required to prevent the escape of material from the enclosure should a small leak in the bag occur, and includes a negative pressure greater than the use of a valve is advantageous, because excessive negative pressure can cause the bag to deform and potentially split.

Usually, the enclosure when in use would be under negative pressure (i.e. pressure less than ambient) of 0.5 inch water (125 Pa) or greater.

Preferably, the bag further comprises a waste port for collecting the hazardous material produced during the treatment of the pipe.

Preferably, the waste port is attached to a waste container, preferably a non-collapsible container. Non-collapsible means that the container will not distort under the conditions of negative pressure within the bag.

The waste container may be sealed to the waste port by any suitable air-tight sealing method, such as by a zip fastener, welding, adhesive tape and/or glue. The seal between the waste container and the waste port may be further covered in an extra layer of bag material, such as PVC, to add further protection from the release of asbestos fibres between the waste port and the outside environment.

The waste port is preferably double sleeved. More preferably comprising an inner sleeve situated in the waste container and an outer sleeve to provide an air-tight seal to the container.

The seams of the bag of the present invention may be welded together. Suitable methods of welding may include hot gas welding, high frequency welding and/or hot plate welding.

The present invention provides, in a second aspect, use of an enclosure according to the first aspect, for the removal and containment of hazardous material from an object, including a pipe or pipes. Such hazardous material may comprise asbestos, radioactive material, chemically reactive material, biohazardous material (for example bacteria or viruses that may be contagious and/or infectious) and/or materials which are otherwise toxic to organisms.

The present invention provides in a third aspect, a method for removal of hazardous material from an object, including a pipe or pipes, the method comprising: providing an enclosure according to the first aspect, placing the enclosure at least partly around the object, removing the hazardous material from the object. Such hazardous material will often comprise asbestos, and/or may also comprise radioactive material, chemically reactive material, biohazardous material (for example bacteria or viruses that may be contagious and/or infectious) and/or materials which are otherwise toxic to organisms.

Preferably, the method further comprises connecting the interior of the bag to a source of negative pressure before removing the hazardous material from the object.

Preferably, the method further comprises the step of applying a wetting liquid to the hazardous material prior to removing the hazardous material from the object. This is advantageous because wetted materials (especially wetted asbestos fibres) tend to remain stuck together (often through surface tension) with less chance of becoming airborne (airborne asbestos fibres pose a serious health and safety risk). The wetting solution may comprise any solution which can be applied to the material. For example, the wetting solution may comprise an aqueous solution of a glue and/or a surfactant.

The present invention provides in a fourth aspect, a method for isolating an animal (e.g. a human or non-human animal) having an infectious and/or contagious disease, the method comprising: providing an enclosure according to the first aspect, placing the enclosure at least partly around the animal.

BRIEF DESCRIPTION OF THE DRAWINGS

An embodiment of the present invention will now be described with reference to the following figures, in which.

DETAILED DESCRIPTION OF THE INVENTION

Figure 1:
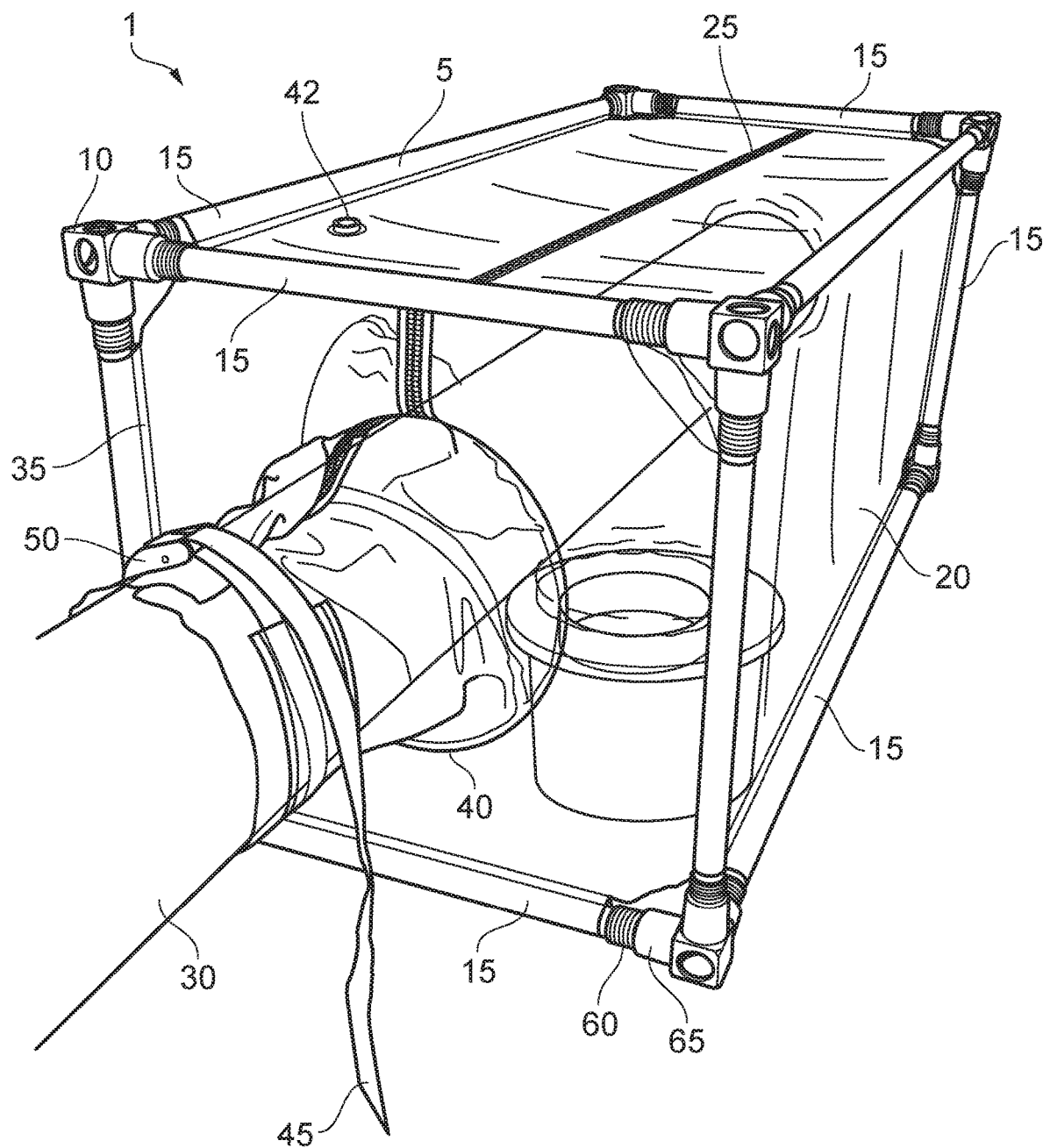
FIG. 1 shows a perspective view of an embodiment of the enclosure of the present invention assembled around a pipe.

Referring to FIG. 1, the enclosure 1 comprises a frame 5 comprising joints 10 at each corner and bars 15 between the joints and along each edge of the enclosure. The bag 20 includes a resealable seam 25 along its length on the upper surface, which when open enables the bag to be arranged around the pipe 30 requiring treatment for asbestos removal. Once the bag is in position around the pipe, the resealable seam 25 is closed.

The bag 20 is supported on the frame by way of sleeves 35 arranged along the length of each side of the bag. In use, the frame may be supported by a structure. Pipe supports 40 enable the bag to be sealed around the pipe. Ties 45 are used to seal the bag around the circumference of the pipe at opposing ends of the enclosure. The ties are tightened over the circumference of the pipe using a ratchet mechanism device 50 to ensure that the seal between the bag and pipe is sufficiently tight to prevent the loss of any asbestos fibres during and after treatment.

A liquid port 42 on the upper surface of the bag 20 is provided so that wetting liquid may be directed at a workpiece inside the enclosure 2 so as to reduce the amount of particulates of the hazardous material being released.

Inside the enclosure 2, there may be a tool pouch (not shown) attachable to the frame 5 or bag 20 to hold tools for use during removal of the hazardous material.

Figure 2:
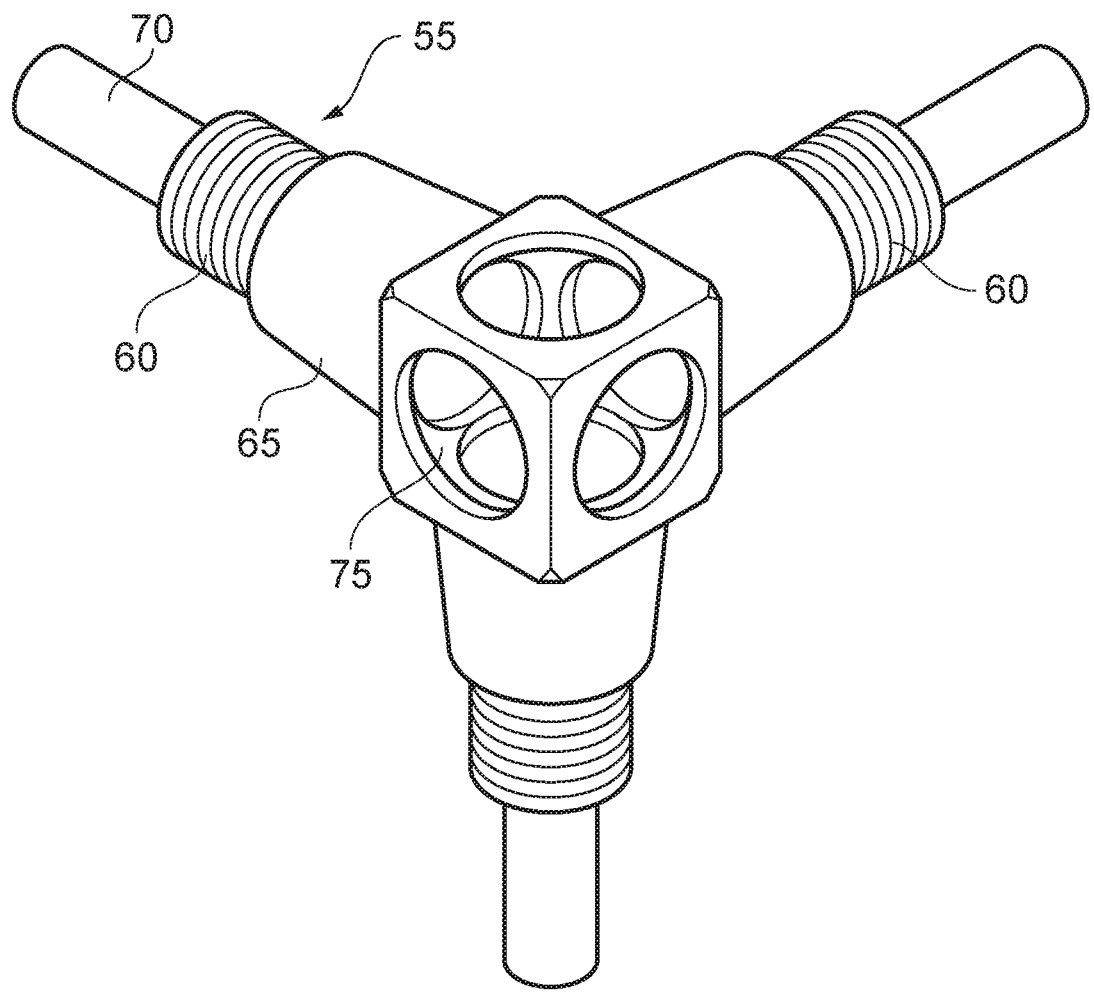
FIG. 2 shows a view of the joint with adjusting device(s) of the enclosure of claim 1.

Referring to FIG. 2, the adjusting device 55 comprises a screw thread 60, a screw thread sleeve 65 and a bar support 70 onto which the bars are attached. In order to increase the length of part of the frame and thereby tighten the bag over the frame, the screw thread 60 is rotated so that it moves inside the screw thread sleeve 70. In this embodiment, the bars and bar supports have a circular cross section. The bars do not attach firmly to the bar supports, so that the bars are able to rotate with respect to the bar support. The bar supports are long enough to extend sufficiently far into the bar to prevent the bar from detaching from the joints when the enclosure is assembled.

When the screw thread 65 is turned so that the screw thread moves out of the screw thread sleeve 70, the bar support is able to rotate within the bar. This has the effect of increasing the length of the side of the enclosure and therefore the bag tightens along that side of the enclosure. Each adjusting device may be operated in a similar way, so that the bag is evenly tightened on each side of the enclosure.

When a key is used to turn the screw thread, the key is inserted through the hole of the extension socket 75, through the screw thread sleeve 65 and into the back of the screw thread 60. The screw thread is adapted to receive the key, so that when the key is rotated, the screw thread rotates.

Further adjusting devices may be added to the joint as indicated by the extension sockets 75. Further adjusting devices enable the enclosure to be extended to accommodate longer sections of pipe or curved or T-shaped sections of pipe. Where an additional adjusting device is added opposite an existing adjusting device on the joint, it is no longer possible to use that extension socket opening for operating a key. In this case, the screw thread may be turned by hand or the key inserted from an adjacent extension socket opening.

Figure 3:
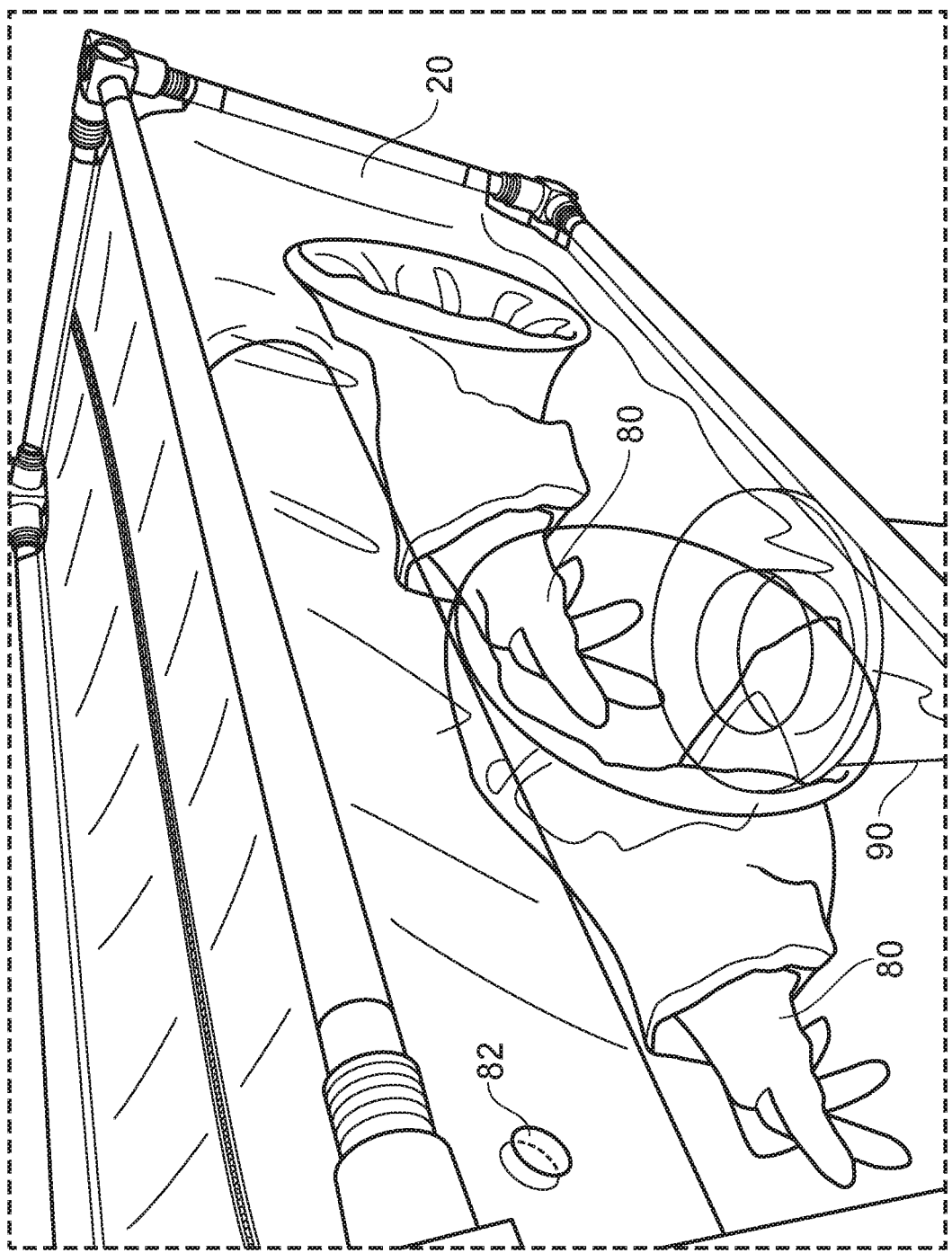
FIG. 3 shows a perspective view of part of the enclosure of FIG. 1, showing the hand pockets.

Referring to FIG. 3, the bag comprises hand pockets or gauntlets 80, which enable the operator to reach inside the enclosure and remove the hazardous materials (e.g. asbestos) from the workpiece (e.g. pipe) without coming into direct contact with the hazardous material. On the side surface of the bag 20, there is a negative pressure port 82 for attachment of a pump (not shown) or other source of negative pressure. The negative pressure port 82 will usually comprise a HEPA filter (not shown). Suitable pumps for generating negative pressure are portable (preferably battery-powered so there are no power leads) pumps, for example, respirator pumps.

Figure 4:
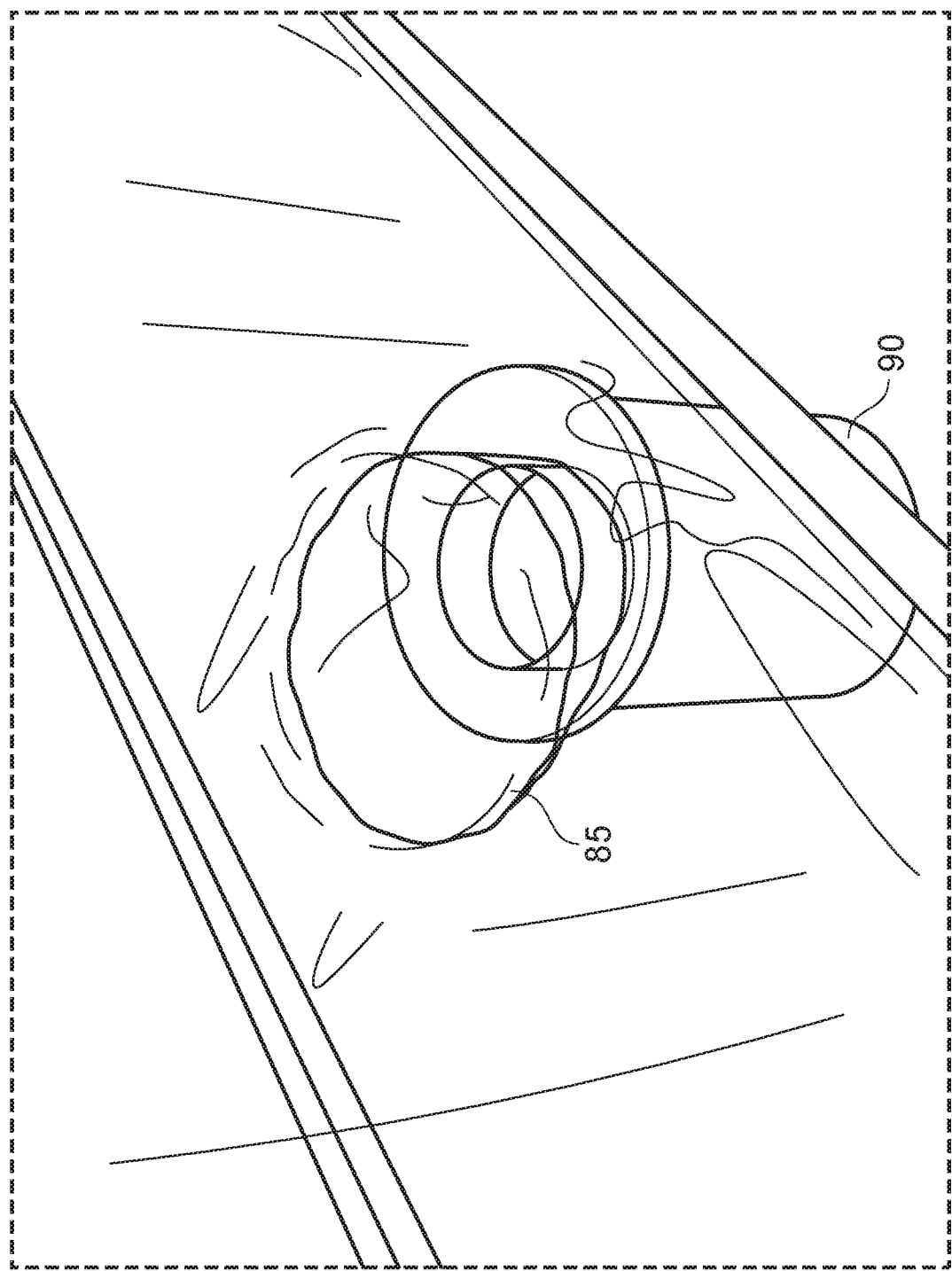
FIG. 4 shows a perspective view of part of the enclosure of FIG. 1, showing the waste port and waste collection container.

Referring to FIG. 4, the bag also comprises a waste port 85 and waste collection container 90 (which may be non-collapsible) for collecting the asbestos once removed from the pipe.

The frame may be assembled in various configurations by adjusting and suitably assembling the bar and joints to provide a modular enclosure of varying size, shape and extent depending on the intended use and the shape of the object from which the hazardous material is to be removed. For example, the enclosure may be assembled/fitted around straight pipe, generally straight pipe with a horizontal outlet (i.e. horizontal tee), straight pipe with vertical outlet (i.e. vertical tee), straight pipe with two horizontal or vertical outlets (i.e. cross-shaped), swept bend from straight pipe, swept horizontal bend, or swept vertical bend.

The invention claimed is:

1. An enclosure for containment and removal of hazardous material from objects, the enclosure comprising:
   a frame comprising a plurality of bars and a plurality of joints, each joint being releasably connectable to at least two bars,
   a flexible bag attachable to the frame, the bag being at least in part transparent, and comprising a resealable seam,
   a negative pressure connector for connecting a source of negative pressure to the interior of the bag, whereby the enclosure, in use, is a negative pressure enclosure, and wherein each joint comprises at least one adjusting device;

wherein the at least one adjusting device comprises one of said plurality of bars support onto which a bar is attached, a screw thread on the bar support, the back of the screw thread being adapted to receive a key, a screw thread sleeve in which the screw thread may rotate and at least one extension socket through which the key may be inserted into the back of the screw thread so that when the key is rotated the screw thread rotates thereby increasing or decreasing the length of at least part of the frame, and thereby tightening or loosening the bag on the frame.

2. An enclosure according to claim 1, wherein the enclosure is for containment and removal of hazardous material from pipes.

3. An enclosure according to claim 1, wherein the flexible bag is attachable to the frame by a plurality of attachment fixings, whereby the frame is outside the bag.

4. The enclosure according to claim 1, wherein the bag further comprises at least one hand pocket to allow an operative to access the material to be contained in the bag.

5. An enclosure according to claim 1, further comprising at least two pipe supports to support a pipe extending in the enclosure.

6. An enclosure according to claim 5, wherein at least one pipe support comprises a resealable aperture in the bag to support a pipe extending through the enclosure.

7. Use of an enclosure according to claim 1, for the removal and containment of hazardous material from an object wherein the hazardous material comprises at least one item selected from the group consisting of asbestos, radioactive material, chemically reactive material, biohazardous material, and material which is toxic to organisms.

8. A method for removal of hazardous material from an object, the method comprising:
providing an enclosure for containment of material, the enclosure comprising: a frame comprising a plurality of bars and a plurality of joints, each joint being releasably connectable to at least two bars, a flexible bag attachable to the frame, the bag being at least in part transparent, and comprising a resealable seam, a negative pressure connector for connecting a source of negative pressure to the interior of the bag, whereby the enclosure, in use, is a negative pressure enclosure, and wherein each joint comprises at least one adjusting device;

wherein the at least one adjusting device comprises a bar support onto which one of said plurality of bars is attached, a screw thread on the bar support, the back of the screw thread being adapted to receive a key, a screw thread sleeve in which the screw thread may rotate and at least one extension socket having a hole through which the key may be inserted into the back of the screw thread so that when the key is rotated the screw thread rotates thereby increasing or decreasing the length of at least part of the frame, and thereby tightening or loosening the bag on the frame;

placing the enclosure at least partly around the object, and removing the hazardous material from the object.

9. A method according to claim 8, further comprising connecting the interior of the bag to a source of negative pressure before removing the hazardous material from the object.

10. A method according to claim 8, further comprising the step of applying a wetting liquid to the hazardous material prior to removing the hazardous material from the object.

11. A method for isolating an animal having a disease selected from an infectious and a contagious disease, the method comprising:
providing an enclosure for containment of material, the enclosure comprising: a frame comprising a plurality of bars and a plurality of joints, each joint being releasably connectable to at least two bars, a flexible bag attachable to the frame, the bag being at least in part transparent, and comprising a resealable seam; a negative pressure connector for connecting a source of negative pressure to the interior of the bag, whereby the enclosure, in use, is a negative pressure enclosure, and wherein each joint comprises at least one adjusting device;

wherein the at least one adjusting device comprises a bar support onto which one of said plurality of bars is attached, a screw thread on the bar support, the back of the screw thread being adapted to receive a key; a screw thread sleeve in which the screw thread may rotate and at least one extension socket having a hole through which the key may be inserted into the back of the screw thread so that when the key is rotated the screw thread rotates thereby increasing or decreasing the length of at least part of the frame, and thereby tightening or loosening the bag on the frame; and placing the enclosure at least partly around the animal.

* * * * *